W. CRAMER.
AUTOMATIC AUTOMOBILE JACK.
APPLICATION FILED MAY 3, 1915.
1,290,916.
Patented Jan. 14, 1919.
2 SHEETS—SHEET 1.
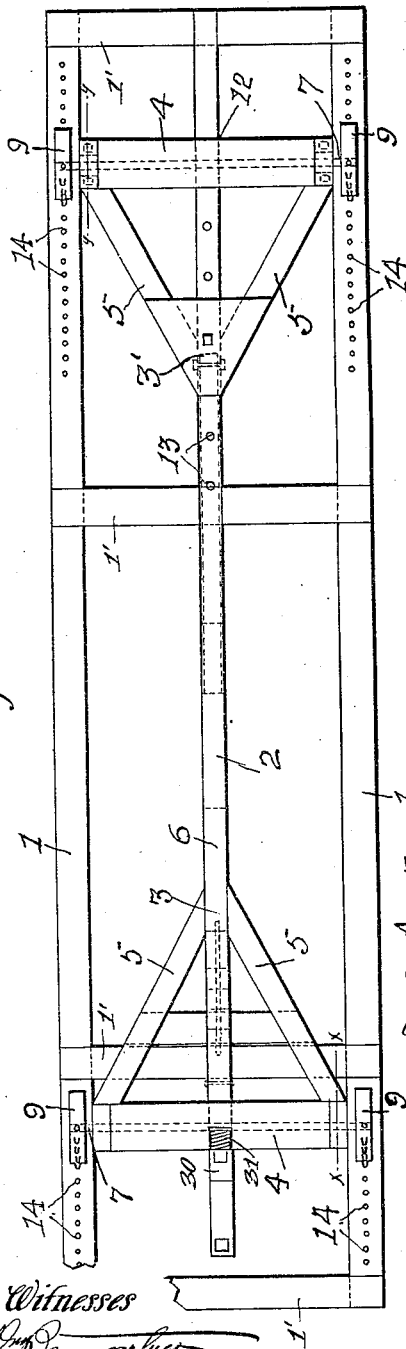
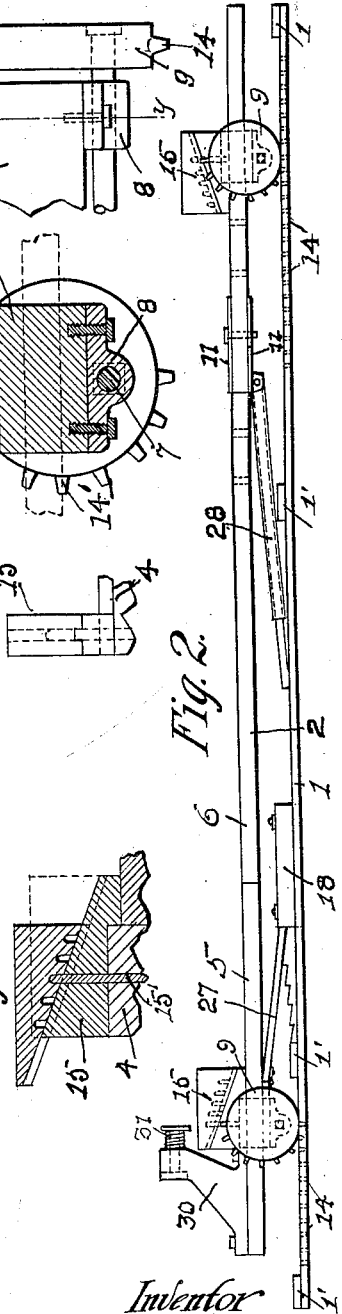
Witnesses
Inventor
William Cramer
by Robt B Wilson
Attorney W. CRAMER.
AUTOMATIC AUTOMOBILE JACK.
APPLICATION FILED MAY 3, 1915.
1,290,916.
Patented Jan. 14, 1919.
2 SHEETS—SHEET 2.
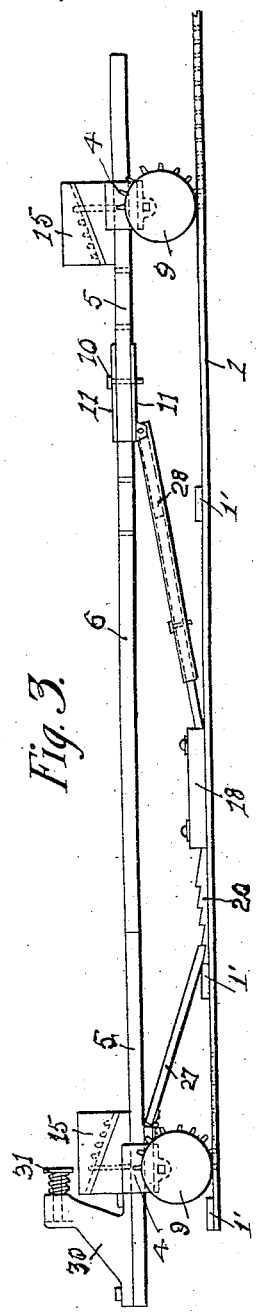
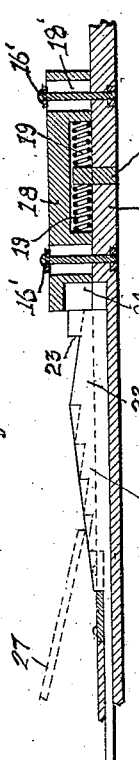
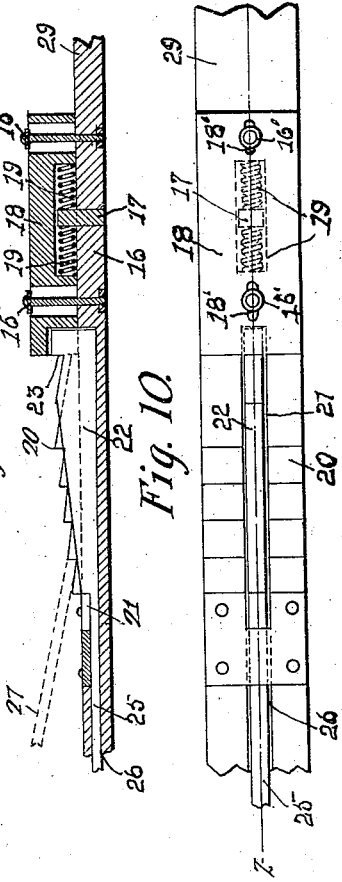
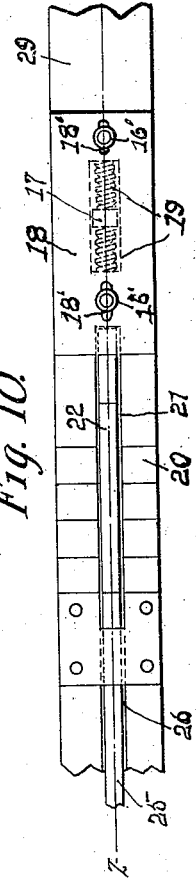
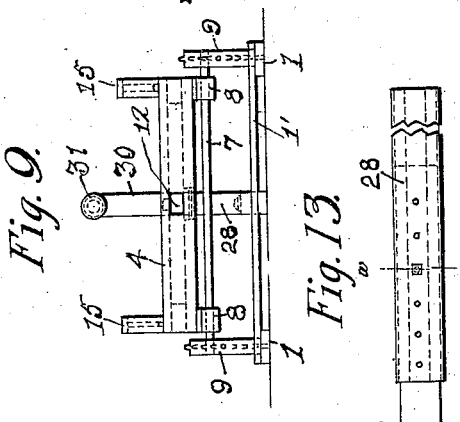
Witnesses
Inventor
William Cramer
by Robt. R. Wilson
Attorney

UNITED STATES PATENT OFFICE.

WILLIAM CRAMER, OF TOLEDO, OHIO.

AUTOMATIC AUTOMOBILE-JACK.

1,290,916.  Specification of Letters Patent.  Patented Jan. 14, 1919.

Application filed May 3, 1915. Serial No. 25,363.

*To all whom it may concern:*

Be it known that I, WILLIAM CRAMER, a citizen of the United States, residing at Toledo, in the county of Lucas and State of Ohio, have invented new and useful Improvements in Automatic Automobile-Jacks, of which the following is a specification.

My invention relates to an automatic automobile jack, and has for its object to provide a jack of the kind that is adapted to be installed on the floor of a garage in position to receive an automobile as it is run by its own power into the garage, and automatically raise the automobile and support it with its wheels raised free of the floor and with the jack automatically locked in such position, and that is adapted to be readily unlocked, and when unlocked, that is adapted to automatically lower the automobile to the floor on its wheels.

I accomplish these objects by the construction and combination of parts as hereinafter described and illustrated in the accompanying drawings, in which—

Figure 1 is a top plan view of an automobile jack constructed in accordance with my invention.

Fig. 2 is a side elevation in lowered position.

Fig. 3 is a similar view in raised position.

Fig. 4 is a top view of an adjustable bolster block.

Fig. 5 is a section of the same on the line $x$—$x$ of Fig. 1.

Fig. 6 is a side elevation of the same.

Fig. 7 is an enlarged broken away side view of a wheel and bolster.

Fig. 8 is a section of the same on line $y$—$y$ of Fig. 7.

Fig. 9 is an end elevation of the jack in raised position.

Fig. 10 is an enlarged top plan view of the bumper block and release key.

Fig. 11 is a section of the same on line $z$—$z$ when the jack is in raised position.

Fig. 12 is a similar view of the jack in lowered position.

Fig. 13 is a top plan view of an adjustable stop bar, and

Fig. 14 is a cross section of the same on line $w$—$w$.

In the drawings 1, 1 designates a pair of flat rails secured to the floor of a garage, and which constitute a track on which a jack truck 2 is movably mounted. The rails 1—1 are cross connected by the ties 1'. The truck 2 comprises the front and rear triangular frames 3 and 3', each formed of a bolster 4 and the hounds 5, the reach 6, which extends centrally through the bolsters 4 and between the hounds 5 of the frames 3 and 3', the axles 7 journaled in boxes 8 secured to the under side of the bolsters 4 near their outer ends, and the wheels 9 eccentrically and fixedly mounted on the end portions of the axles 7.

The front frame 3 is fixedly mounted on the reach 6 and the rear frame 3' is adjustably mounted thereon by a king pin 10 through plates 11 connecting and suitably secured to the under and upper sides of the hounds 5 at their converging end portions, and between which and the hounds 5, the reach 6 slidably extends to and through a squared opening 12 formed centrally of the rear bolster 4, the reach 6 being provided with a series of holes 13 to receive the pin 10, and permit adjustment of the distance between the bolsters to the distance between the axles of an automobile.

The track rails 1, 1 at their end portions are provided at regular intervals with a series of depressions or holes 14 to receive a series of pins or cogs 14' projecting radially as cogs from one half of the periphery of each wheel 9, the half portions being established by lines diametric of the wheels through the points of the greatest and least eccentricity of each wheel.

To the end portions of each bolster 4 are mounted and secured the adjustable blocks 15 adapted to engage the under side of the axles of an automobile and support the automobile on the bolsters 4 of the truck 2. The blocks 15 are made adjustable in height by forming each block of two triangular pieces which are joined along the sides forming the hypotenuse of the triangles, one of which is grooved and the other is provided with a tongue to enter the groove. The lower half block is provided with a pin 15' the point of which projects in the upper half which is provided with a series of holes whereby the upper half of the block may be adjusted thereon at different heights, as shown in Fig. 5.

On the floor of the garage is mounted and suitably secured centrally between the rails 1 and between the series of holes 14, a bumper base 16, having a central bumper post 17, on the bumper base 16 is slidably mounted an elongated bumper block 18, having its central portion formed hollow to receive the bumper post 17, and the helical springs 19, between the post and the end portions of the block 18, whereby the block is made adapted to yield from either end toward the post. The block 18 is secured to base 16 by bolts 16' extending through slots 18' of the block 18.

The base 16, formed of the bumper block 18, is reduced in thickness (as shown in Figs. 11 and 12), and has mounted and secured thereon, abutting the block 18, an elongated bifurcated stop block 20, which from a point forward of the block 18, is provided with a short rearward incline toward the block 18, and from the same point forward, with a longer stepped incline, as shown in side elevation in Figs. 3, 11 and 12, and in plan view in Fig. 10. The bifurcations of the stop block 20 form with the base 16, a slide way 21 (shown in plan view in Fig. 10 and in side elevation by the horizontal dotted lines in Figs. 11 and 12 for a release key 22, the central portion of which is inclined to correspond with the outer angles of the steps of the block 20, when the key is drawn forward and which corresponds with the inner angles thereof when pushed rearward. The rearward end portion of the key is cut away on an incline rearward to a shoulder 23 which is normally within a recess 24 in the forward end of the bumper block, as shown in Fig. 11, but when the key is drawn forward in position of release the shoulder 23 is in position as shown in Fig. 12.

The forward end of the key is provided with a rod 25 which extends forward through a suitable groove 26 in the underside of the forward end portion of the stop block 20 to and beyond the ends of the tracks 1, 1.

To the under side of the reach 6, rearward of the front bolster 4, is hinged a stop bar 27, the free end of which extends rearward and inclined downwardly, and is normally in engagement with the front end of the bumper block 18 as shown in Fig. 2. There is also hinged to the under side of the lower plate 11 connecting the hounds 5 of the rear bolster, the adjustable stop bar 28, the free end of which is in sliding engagement with a rearward extension 29 of the bumper base 16, when the jack is in lowered position as shown in Fig. 2, and in engagement with the bumper block 18 in the raised position of the jack, as shown in Fig. 3.

On the front end portion of the reach 6, forward of the front bolster, is mounted and secured a block 30 to the rear side of which is secured a spring buffer 31 which projects from the block 30 at a height in the lowered position of the jack to be engaged by the front axle of an automobile in passing over the front bolster 4.

Thus constructed, and the bolster being adjusted at the proper distance apart on the reach 6 to receive the axle of an automobile, and the jack being in lowered position, as shown in Fig. 2, with the front stop bar in engagement with the front end of the bumper block 18 and the rear stop bar 28 rearward of the bumper block 18 a distance equal to one half the circumference of a traction wheel 9, the automobile is run slower over the jack with the wheels astride the jack until the spring buffer 31 is engaged by the front axle of the car, at or before which time the power is shut off and the momentum of the machine carries the jack forward on its wheels one half a revolution, whereby the body of the jack is raised until the blocks 15 of each bolster are brought upward by the eccentricity of the wheels 9 into contact with the under side of the front and rear axles of the automobile, and raise it until the wheels are free from the floor as the rear stop bar engages the bumper block 18 and prevents further movement of the jack, and at the same moment the front stop bar drops in front of one of the steps of the stop block 20 and locks the jack against backward movement, thereby holding the jack in its highest raised position supporting the automobile with its wheels raised above the floor and locked against either forward or backward movement by the stop bars 27 and 28.

In the forward end of the rod 25 of the release key 22 is attached a cord (not shown) whereby when it is desired to lower the automobile to the floor, the key 22 is pulled forward until it has raised and released the forward stop bar 27, which permits the reaction of the flexed spring of the bumper block 18 on the stop bar 28 whereby the wheels 9 of the truck are carried out of their center of gravity and the jack returns to its normal lowered position as shown in Fig. 2, thereby automatically lowering the wheels of the car to the floor and giving the car a momentum that carries it backward a distance on its wheels.

By the construction shown and described I have provided a convenient means for automatically raising and supporting an automobile with its wheels free from the floor whereby the pneumatic tires of the wheels are relieved from the weight of the car during long periods of rest and preserved from the deteriorating effect of standing in oil or moisture on the floor and also are put in convenient position for examination of their condition after being used on the road, and for repair if needed.

It is manifest that minor changes in the construction of my jack may be made without departing from the principle of its construction and operation and I therefore do not limit myself to the exact forms of construction of the several parts shown.

What I claim to be new is—

1. In an automatic automobile jack, the combination with a trackway and a stop block for the trackway, of a jack truck movably mounted on the trackway, said truck comprising a pair of axles, a pair of wheels eccentrically and fixedly mounted on each axle, a truck frame mounted on the axles by boxes journaling the axles, a supporting block or blocks mounted on the frame above each axle, a buffer mounted on the frame adapted to engage the front axle of an automobile in passing lengthwise over and astride the track when the axles of the truck are normally nearest the truck, a rearwardly inclined front stop bar hinged to the truck, and adapted to engage a forward shoulder of the stop block, and a forwardly inclined rear stop bar, hinged to the truck, and adapted to engage a rearward shoulder of the stop block, when the wheels of the truck have turned one half of a revolution forward on the track.

2. In an automatic automobile jack, the combination with a trackway, and a stop block for the trackway, of a jack truck movably mounted on the trackway, said truck comprising a pair of axles, a pair of wheels fixedly and eccentrically mounted on each axle, a bolster mounted on each axle by boxes journaling the axle, a reach connecting the bolsters, a pair of blocks on each bolster, a buffer mounted on the reach adapted to engage the front axle of an automobile in passing lengthwise over and astride the truck, when the axles of the truck are normally nearest the trackway, a rearwardly inclined front stop bar hinged to the truck, and adapted to engage a forward shoulder of the stop block, and a rearwardly inclined rear stop bar, hinged to the truck, and adapted to engage a rearward shoulder of the stop block, when the wheels of the truck have turned one half a revolution forward on the track.

3. In an automatic automobile jack, the combination with a trackway, and a stop block for the trackway, of a jack truck movably mounted on the trackway, said truck comprising a pair of axles, a pair of wheels fixedly and eccentrically mounted on each axle, a bolster mounted on each axle by boxes journaling the axle, a reach adjustably connecting the bolsters, a pair of blocks on each bolster, a buffer mounted on the reach adapted to engage the front axle of an automobile in passing lengthwise over and astride the truck, when the axles of the truck are normally nearest the trackway, a rearwardly inclined front stop bar hinged to the truck, and adapted to engage a forward shoulder of the stop block, and a forwardly inclined rear stop bar, hinged to the truck, and adapted to engage a rearward shoulder of the stop block, when the wheels of the truck have turned one half a revolution forward on the track.

4. In an automatic automobile jack, the combination with a trackway, and a stop block for the trackway, of a jack truck movably mounted on the trackway, said truck comprising a pair of axles, a pair of wheels fixedly and eccentrically mounted on each axle, a bolster mounted on each axle by boxes journaling the axle, a reach connecting the bolsters, a pair of blocks on each bolster, said blocks being adjustable in height, a buffer mounted on the reach adapted to engage the front axle of an automobile in passing lengthwise over and astride the truck, when the axles of the truck are normally nearest the trackway, a rearwardly inclined front stop bar hinged to the truck, and adapted to engage a forward shoulder of the stop block, and a forwardly inclined rear stop bar, hinged to the truck, and adapted to engage a rearward shoulder of the stop block, when the wheels of the truck have turned one half a revolution forward on the track.

5. In an automatic automobile jack, the combination with a trackway, having depressions at regular intervals of end portions thereof, and a stop block for the trackway, of a jack truck movably mounted on the trackway, said truck comprising a pair of axles, a pair of wheels fixedly and eccentrically mounted on each axle, said wheels each having radial cog-like projections from one half of the periphery, divided at points of its greatest and least eccentricty, a bolster mounted on each axle by boxes journaling the axle, a reach connecting the bolsters, a pair of blocks on each bolster, a buffer mounted on the reach adapted to engage the front axle of an automobile in passing lengthwise over and astride the truck, when the axles of the truck are normally nearest the trackway, a rearwardly inclined front stop bar hinged to the truck and adapted to engage a forward shoulder of the stop block and a forwardly inclined rear stop bar, hinged to the truck, and adapted to engage a rearward shoulder of the stop block, when the wheels of the truck have turned one half a revolution forward on the track.

6. In an automatic automobile jack, the combination with a trackway and a stop block for the trackway, of a jack truck movably mounted on the trackway, said truck comprising a pair of axles, a pair of wheels fixedly and eccentrically mounted on each axle, a bolster mounted on each axle by boxes journaling the axle, a reach connecting the bolsters, a pair of blocks on each bolster, a buffer mounted on the reach adapted to engage the front axle of an automobile in passing lengthwise over and astride the truck, when the axles of the truck are normally nearest the trackway, a rearwardly inclined front stop bar hinged to the truck, and adapted to engage a forward shoulder of the stop block, a forwardly inclined rear stop bar, hinged to the truck and adapted to engage a rearward shoulder of the stop block, when the wheels of the truck have turned one half a revolution forward on the track and a trip key adapted to release the front stop bar.

7. In an automatic automobile jack, the combination with a trackway, and a spring yielding stop block for the trackway, of a jack truck movably mounted on the trackway, said truck comprising a pair of axles, a pair of wheels fixedly and eccentrically mounted on each axle, a bolster mounted on each axle by boxes journaling the axle, a reach connecting the bolsters, a pair of blocks on each bolster, a buffer mounted on the reach adapted to engage the front axle of an automobile in passing lengthwise over and astride the truck, when the axles of the truck are normally nearest the trackway, a rearwardly inclined front stop bar hinged to the truck, and adapted to engage a forward shoulder of the stop block, and a forwardly inclined rear stop bar, hinged to the truck, and adapted to engage a rearward shoulder of the stop block, when the wheels of the truck have turned one half a revolution forward on the truck.

In testimony whereof I have hereunto set my hand at Toledo, Ohio, in the presence of two subscribing witnesses, this 16th day of April, 1915.

WILLIAM CRAMER.

In presence of—
   ALBERT T. GOORLEY,
   A. F. HANSON.

Copies of this patent may be obtained for five cents each, by addressing the "Commissioner of Patents, Washington, D. C."